United States Patent [19]

Kawakami

[11] Patent Number: 4,827,357
[45] Date of Patent: May 2, 1989

[54] APPARATUS FOR COPYING MODULATED VIDEO SIGNALS FROM RECORDING MEDIUM TO RECORDING MEDIUM INCLUDING COLOR AND CHROMA CORRECTION

[75] Inventor: Chikuni Kawakami, Tokyo, Japan

[73] Assignee: Fuji Photo Film Co., Ltd., Kanagawa, Japan

[21] Appl. No.: 53,119

[22] Filed: May 22, 1987

[30] Foreign Application Priority Data

May 24, 1986 [JP] Japan .................................. 61-118416
May 24, 1986 [JP] Japan .................................. 61-118417

[51] Int. Cl.$^4$ .................................................. H04N 9/79
[52] U.S. Cl. ............................................. 358/310; 360/15
[58] Field of Search ............... 360/15, 7, 31; 358/310, 358/335, 342

[56] References Cited

U.S. PATENT DOCUMENTS 4,506,304  3/1985  Harvey ............................... 360/15 X
4,628,370  12/1986  Fukuoka ............................... 360/15
4,725,899  2/1988  Gardner ................................ 360/15

Primary Examiner—Robert L. Richardson
Attorney, Agent, or Firm—Birch, Stewart, Kolasch & Birch

[57] ABSTRACT

An apparatus for copying video signals from a first magnetic recording medium to a second magnetic recording medium having a playback section for reading out modulated video signals from the first magnetic recording medium on which the modulated video signals are recorded, and a recording section for recording on the second magnetic recording medium the modulated video signals read out by the playback section. The playback section includes a playback unit for driving the first magnetic recording medium and for reading out the modified video signals therefrom, and a first display for visually displaying a picture represented by the modulated video signals thus read. The recording section includes a driver for driving the second magnetic recording medium in synchronism with the driving operation of the first magnetic recording medium, a recorder for receiving the modulated video signals delivered from the playback unit to record the modulated video signals on the second magnetic recording medium, and a second display for visually displaying a picture represented by the modulated video signals received from the playback unit.

17 Claims, 5 Drawing Sheets

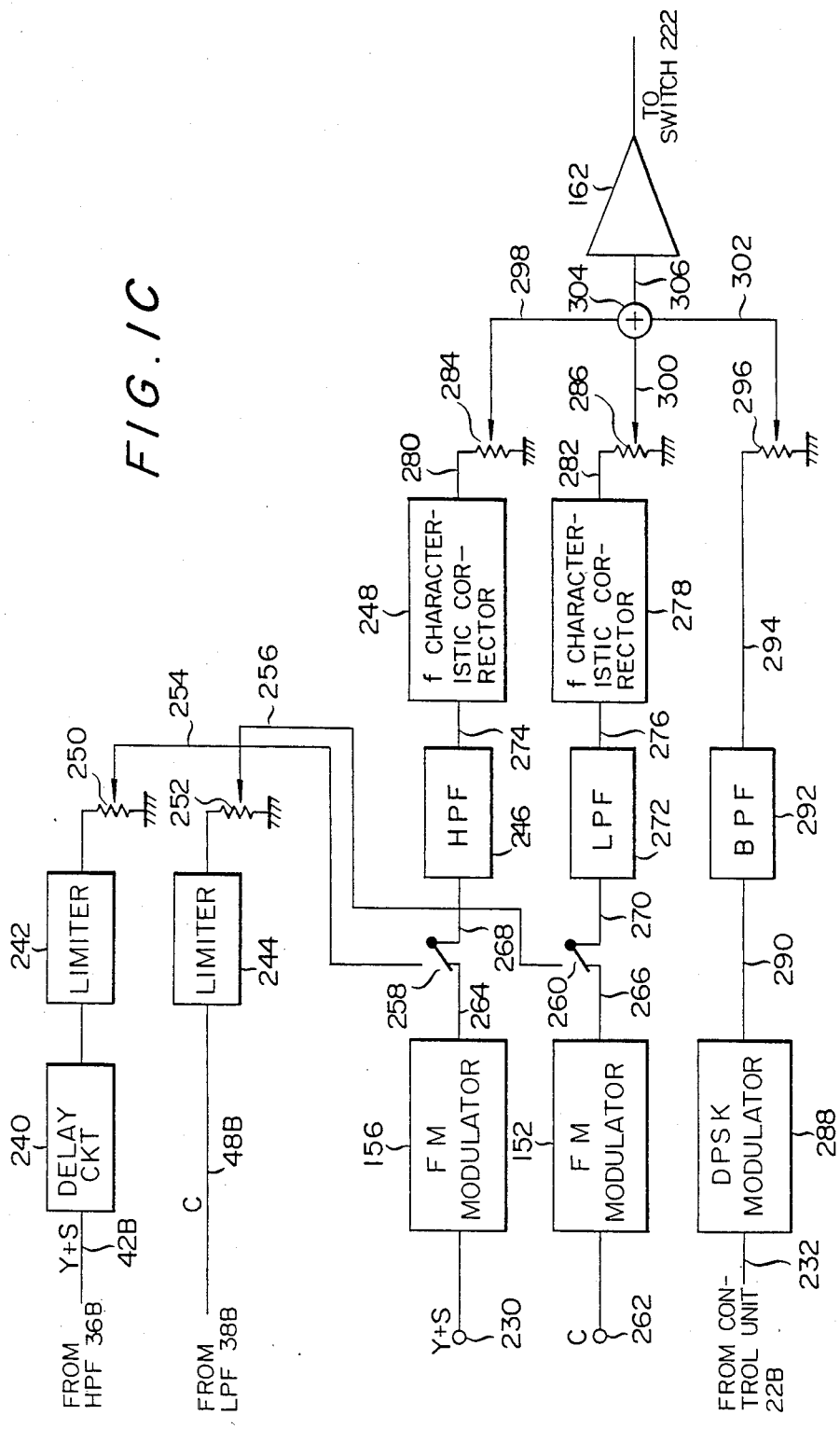

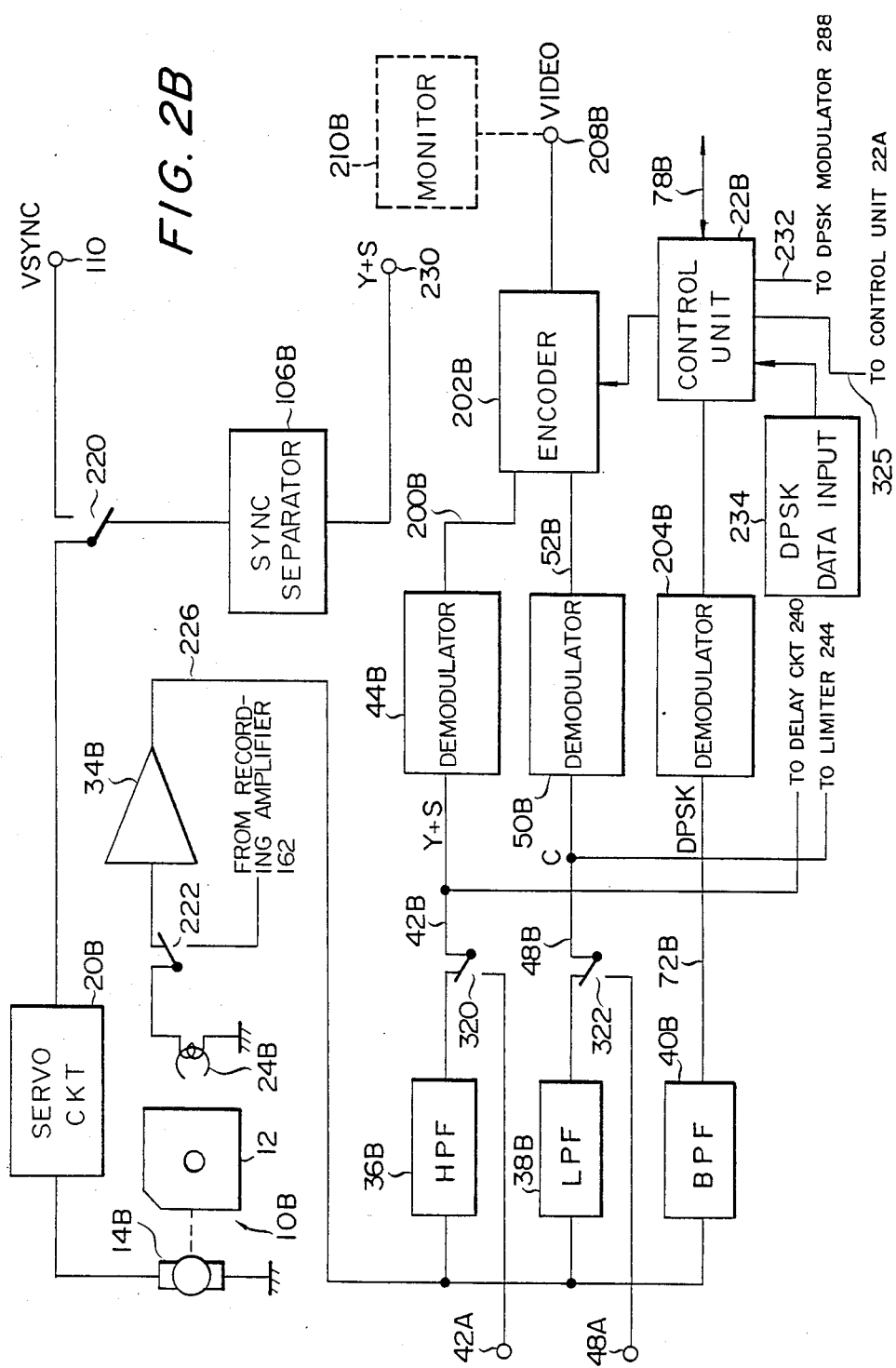

APPARATUS FOR COPYING MODULATED VIDEO SIGNALS FROM RECORDING MEDIUM TO RECORDING MEDIUM INCLUDING COLOR AND CHROMA CORRECTION

BACKGROUND OF THE INVENTION

1. Field of the Invention

The present invention relates to an apparatus for copying video signals from a recording medium to another recording medium, and in particular, to a video signal copying apparatus for reproducing video signals recorded on a magnetic recording medium such as a magnetic disk, a magnetic tape, or a magnetic drum to record the reproduced video signals on another magnetic recording medium.

2. Description of the Prior Art

Recently there has been developed an electronic still camera system in which an imaging device such as a solid-state imaging device or an imaging tube is combined with a recording unit using, as a recording medium, a low-priced magnetic disk having a relatively large storage capacity, to shoot an object to record a still picture thereof on the disk rotating at a stable rotary speed. A reproduction or playback of pictures is conducted with a separate TV system or printer.

For a rotary magnetic recording medium for an electronic still camera, a disk with a small diameter is used, for example, of about 50 millimeters (mm) and with a track pitch of about 100 $\mu$m, namely, 50 tracks may be recorded thereon with a track width of about 50–60 $\mu$m and with a guard band width of about 50–40 $\mu$m. In a recording or playback apparatus, the magnetic disk rotates at a constant rotary speed of, for example, 3,600 revolutions per minute (rpm) to achieve a recording or playback of video signals at a field or frame rate.

According to the systems proposed at the present state of art, a luminance signal of video signals occupies a high frequency band of more than 2.5 megahertz (MHz) including a synchronizing signal with frequency modulated (FM) in a frequency range from 6 MHz to 7.5 MHz. A chroma signal is subjected to a frequency modulation in the color-difference line-sequential scheme using a band lower than that used for the luminance signal with the center frequencies of the R-Y and B-Y signals set to 1.2 MHz and 1.3 MHz, respectively. Data such as a field number and a frame number may be recorded together therewith under the differential PSK (Phase Shift Keying) modulation.

The video signals recorded on a magnetic disk are read and demodulated by the playback apparatus to be encoded into signals in the standard color TV format, such as the NTSC, so as to be visually displayed on a video monitor.

There is required a useful apparatus for duplicating a magnetic disk on which video signals are thus recorded. For example, it is required that a dubbing operation of video signals be achieved through a simple operation while monitoring a picture to be copied and represented by the video signals, and that a picture resultant from the dubbing operation be immediately monitored by a simple operation.

One of the requirements for a dubbing system is a low deterioration of a signal to be recorded, and hence, a low deterioration of the quality of the reproduced picture. In addition, it is desirable that a special circuit such as an emphasis compensation circuit is not necessary to prevent the picture quality from being lowered. Editing capability of the contents to be recorded on a picture recording medium is also required. Particularly, for a commercial use in conducting duplication of such recording media, it is further required that a plurality of recording media be subjected to a dubbing operation from a single video signal source.

SUMMARY OF THE INVENTION

It is therefore an object of the present invention to provide an apparatus for copying video signals from a recording medium to another recording medium which is highly useful for the requirements described above.

Another object of the present invention is to provide an apparatus for copying video signals from a recording medium to another recording medium which is capable of recording video signals with minimized deterioration of the picture quality.

According to the present invention, there is provided an apparatus for copying video signals from a first magnetic recording medium to a second magnetic recording medium including a playback section for reading out modulated video signals from the first magnetic recording medium on which the video signals modulated are recorded, and a recording section for recording on the second magnetic recording medium the modulated video signals read out by the playback section, the playback section comprising playback means for driving the first magnetic recording medium and for reading out modulated video signals therefrom, and first display means for visually displaying a picture represented by the modulated video signals thus read, the recording section comprising driving means for driving the second magnetic recording medium in synchronism with driving operation of the first magnetic recording medium, recording means for receiving modulated video signals produced from the playback means to record the modulated video signals on the second magnetic recording medium, and display means for visually displaying a picture represented by the modulated video signals received from the playback means.

Also, according to the present invention, there is provided an apparatus for reading modulated video signals from the first magnetic recording medium on which the video signals modulated with a luminance signal and a color signal are recorded, and for recording the modulated video signals on the second magnetic recording medium to thereby copy video signals from a first magnetic recording medium to a second magnetic recording medium comprising playback means for driving the first magnetic recording medium and for reading out the modulated video signals therefrom, driving means for driving the second magnetic recording medium in synchronism with driving operation of the first magnetic recording medium, separating means for separating a luminance signal and a color signal from the modulated video signals thus read, first limiter means for limiting a level of the separated luminance signal, second limiter means for limiting a level of the separated color signal, first frequency characteristic correcting means for correcting a frequency characteristic of the luminance signal limited in level, second frequency characteristic correcting means for correcting a frequency characteristic of the color signal limited in level, and recording means for combining the luminance signal and the color signal respectively produced from the first and second frequency characteristic correcting means to record resultant signals in the form of modulated video signals on the second magnetic recording medium.

Furthermore, according to the present invention, there is provided an apparatus for copying video signals from a first magnetic recording medium to a second magnetic recording medium comprising a playback section for reading modulated video signals from the first magnetic recording medium on which the modulated video signals are modulated with a luminance signal and a color signal, and a recording section for recording on the second magnetic recording medium the modulated video signals read out from the playback section, the playback section including first playback means for driving the first magnetic recording medium and for reading therefrom the modulated video signals, synchronizing signal separating means for separating a synchronizing signal from the modulated video signals thus read, and first display means for visually displaying a picture represented by the modulated video signals, the recording section including signal separating means for receiving the modulated video signals to separate therefrom a luminance signal and a color signal, first limiter means for limiting a level of the separated luminance signal, second limiter means for limiting a level of the separated color signal, first frequency charcteristic correcting means for correcting a frequency characteristic of the luminance signal limited in level, second frequency characteristic correcting means for correcting a frequency characteristic of the color signal limited in level, driving means for receiving the separated synchronizing signal to drive the second magnetic recording medium in response to the synchronizing signal, combining means for combining the luminance signal and the color signal respectively produced from the first and second frequency characteristic correcting means, recording means for recording signals supplied from the combining means in the form of modulated video signals on the second magnetic recording medium, and second display means for visually displaying a picture represented by the modulated video signals received from the first playback means.

According to the present invention, the signal separating means may be disposed in the playback section, and the recording section receives the luminance signal and the color signal separated by the first and second limiter means, respectively.

In the specification, the term "copy" or "duplicate" is to be interpreted in a wide sense, namely, including not only a case where video signals recorded on a recording medium are entirely rerecorded on another recording medium without any change but also "editing" for selectively rerecording the video signals on another recording medium.

BRIEF DESCRIPTION OF THE DRAWINGS

The objects and features of the present invention will become more apparent from the consideration of the following detailed description taken in conjunction with the accompanying drawings in which:

FIGS. 1A, 1B and 1C are schematic block diagrams showing an embodiment of the apparatus for copying video signals from a recording medium to another recording medium according to the present invention; and FIGS. 2A and 2B are schematic block diagrams partially illustrating an alternative embodiment of the present invention.

DESCRIPTION OF THE PREFERRED EMBODIMENTS

Figure 1A:
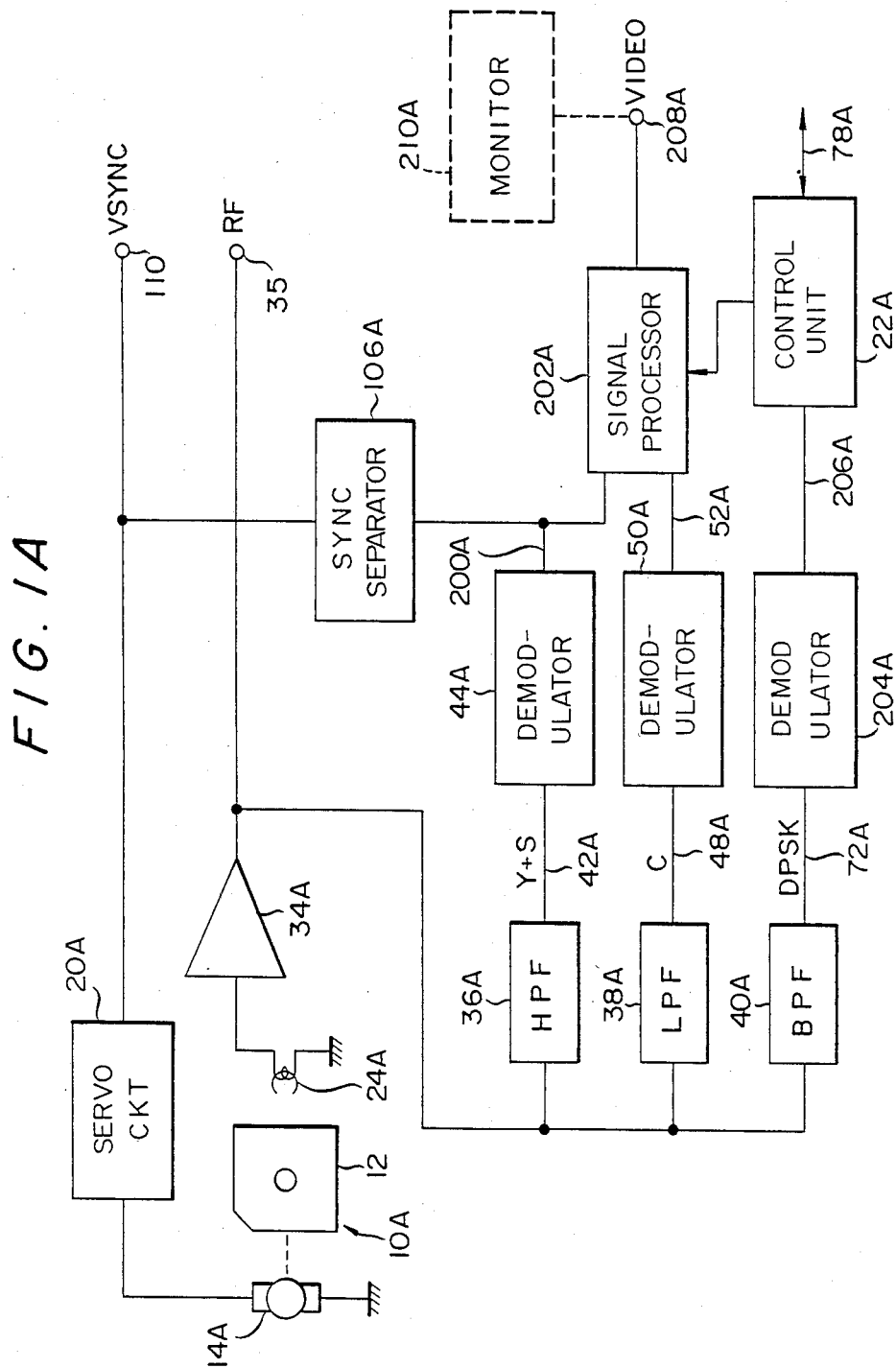
Figure 1B:
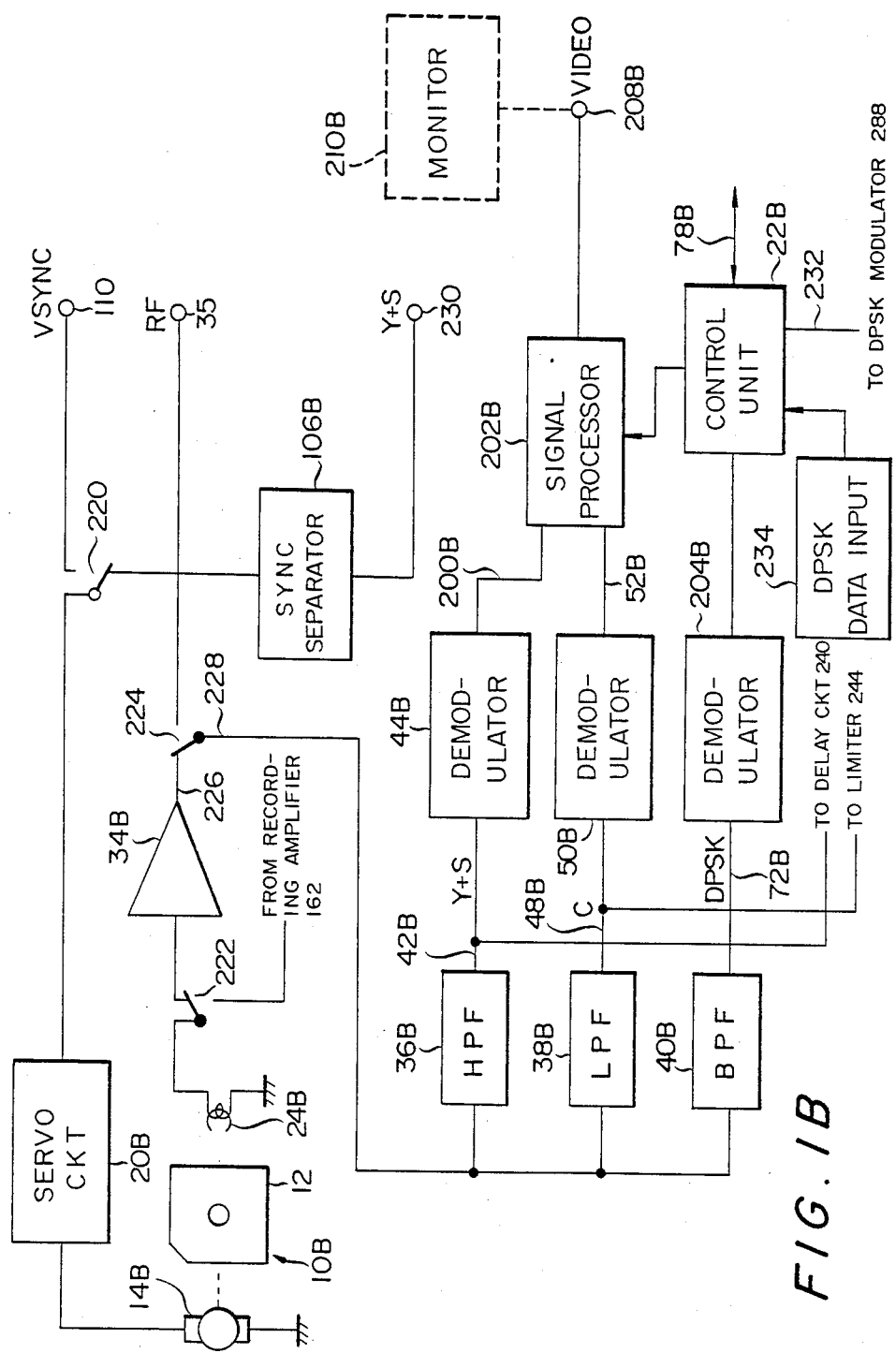

FIG. 1A shows a section which implements a reproducing function for sensing video signals from a magnetic disk, whereas FIGS. 1B-1C depict a section mainly achieving a function to record the video signals on another magnetic disk. Both sections may be configured as separate units from each other.

The system in accordance with the embodiment of FIGS. 1A-1C includes two deck subsections 10A and 10B in which, for example, rotary recording media such as magnetic disks are detachably mounted on rotation shafts of dc motors 14A and 14B, respectively.

The magnetic disk 12 in the embodiment has a sheet of a magnetic recording material with a diameter of about 50 mm. On a recording surface 18 thereof, a plurality of recording tracks, for example, 50 tracks may be concentrically recorded with a predetermined pitch, for example, about 100 $\mu$m. Signals to be recorded on recording tracks include video signals, which may, in this embodiment, be color video signals with a luminance signal Y and a chroma signal C frequency-modulated. The video signals are recorded, for example, in such a fashion that a field of video signals which represent a field of an image in a raster scanning fashion are recorded in a track.

The luminance signal Y occupies a high frequency band above 2.5 MHz including a synchronizing signal S with the frequency modulation conducted in a frequency range from 6 MHz to 7.5 MHz. The chroma signal C is subjected to a frequency modulation ranging in a frequency band lower than that used for the luminance signal Y. For two kinds of color difference signals, the R-Y and B-Y signals, the center frequencies are set to 1.2 MHz and 1.3 MHz, respectively. For these color difference signals, the color-difference line-sequential system is adopted in which the two kinds of color difference signals alternately appear for respective pairs any each couple of horizontal scanning lines. Data such as a field number and a frame number may be multiplexed with the video signals under the differential PSK (DPSK) modulation. The DPSK signal is superimposed with a carrier frequency of 204.54 kHz on the FM signal.

The dc motors 14A and 14B have a mechanism for generating an ac frequency signal and a phase synchronizing signal in response to the rotation thereof and are powered from servo circuits 20A and 20B, respectively, so as to be subjected to a servo control to cause the disks 12 to rotate at a predetermined rotary speed, for example, 3,600 rpm. Servo circuits 20A and 20B are respectively supplied with phase synchronizing signals respectively from synchronization signal separate circuits 106A and 106B, described later, when the disks 12 are driven or stopped in rotation by control units 22A and 22B controlling the reproducing function section and the recording function section, respectively. The phase synchronizing signal may be generated by the disk 12. In the latter case, the signal is generated by sensing a timing mark provided in a portion of a core of the magnetic disk 12.

The deck subsection 10A functions as a playback unit for reproducing video signals, which will be described later. Consequently, the deck subsection 10A is loaded with a disk 12 on which video signals have already been recorded. Over a recording surface of such a disk 12, there is disposed a magnetic transducer or magnetic head 24A, which is carried by a head moving mechanism, not shown, and can radially and bidirectionally be moved over the recording surface of the magnetic disk 12 under the control of the tracking servo system. This control is accomplished by the control unit 22A configured to select a desired track on the recording surface when an operator console, not shown, of this system is operated.

The magnetic head 24A has a reproducing function to sense a video signal recorded in a track of a recording surface 18 to convert the signal into a corresponding electric signal. As described above, since the disk 12 rotates at a fixed rotary speed of 3,600 rpm in this embodiment, video signals contained in a track, namely, a field of FM video signals are reproduced for each rotation or at an interval of 1/60 second from the magnetic head 24A.

The magnetic head 24A has a playback output 32 which is connected via a preamplifier 34A to an RF output terminal 35, and on the other hand, is connected to three filters including a high-pass filter (HPF) 36A, a low-pass filter (LPF) 38A, and a band-pass filter (BPF) 40A. The high-pass filter 36A is used to pass the high-frequency components, namely, the luminance signal Y and the synchronizing signal S included in the video signals sensed by the magnetic head 24A, and has an output 42A connected to an FM demodulator 44A. The FM demodulator 44A demodulates the luminance signal Y and the synchronizing signal S, and has a demodulation output 200A connected to a synchronizing signal separating circuit 106A and an input of an encoder 202A.

The synchronizing signal separating circuit 106A separates a vertical synchronizing signal VSYNC from an output signal from the demodulator 44A to feed the VSYNC to the servo circuit 20A and a synchronizing signal output 110.

The low-pass filter 38A is used to pass low-frequency components, namely, line sequential color difference signals R-Y and B-Y included in the video signals sensed by the magnetic head 24A, and has an output 48A connected to an FM demodulator 50A. The FM demodulator 50A demodulates the color difference signal C and has a demodulation output 52A connected to another input of the encoder 202A.

The band-pass filter 40A has an output 72A connected to a DPSK demodulator 204A, which demodulates the 204.54 kilohertz (kHz) DPSK (Differential Phase Shift Keying) signal superimposed on the video signal to deliver the obtained signal in the form of digital data from an output 206A to the control unit 22A.

The signal processing circuit 202A includes the necessary circuits such as a coincidence circuit for converting the line-sequential color-difference signals supplied from the demodulator 44A and 50A into signals containing a couple of color difference signals in each scanning line, a combining circuit for combining a composite luminance signal Y+S and the color difference signal C, and a circuit for achieving a field-to-frame conversion according to scanning-line interpolation, as well as circuits, related to the NTSC, including an encoder for producing the standard composite color TV video signal. In the operation, the character data such as a frame number included in the DPSK data supplied from the demodulator 204A to the control unit 22A are multiplexed in the frame of a picture by the signal processing circuit 202A. The color video signal thus generated is delivered from a video signal output (VIDEO) 208A of the signal processing circuit 202A to be, for example, displayed on a video monitor device 210A such as a CRT.

The control unit 22A controls the playback section of this system in response to operations on its operator console, and is advantageously configured, for example, by use of a microprocessor system. Although the control unit 22A is connected to the respective components in the system, the connections are symbolically indicated with a connecting line 78A.

Referring now to FIG. 1B, the deck subsection 10B functions to record a video signal, which will be described later. Consequently, the deck subsection 10B is generally loaded with a disk 12 on which video signals are to be recorded. Over a recording surface of such a disk 12, there is disposed a magnetic transducer or a magnetic head 24B. The magnetic head 24B is carried on a head transport mechanism, not shown, so as to be moved radially and bidirectionally along the recording surface of the magnetic disk 12. The control of the movement is effected by the control unit 22B. The magnetic head 24B of this embodiment has not only the recording function to record video signals on the recording surface but also the playback function.

For the playback function, the recording section of FIG. 1B has a configuration almost the same as that of the reproducing section of FIG. 1A. In FIG. 1B, the components similar to those of FIG. 1A are assigned with the same reference numerals having a subscript B and the description thereof will not be redundantly given.

The servo circuit 20B for effecting a servo control on the motor 14B selectively receives via a switch 220 a vertical synchronization signal VSYNC from the synchronizing signal terminal 110 and a synchronizing signal separating circuit 106B. When dubbing video signals from the magnetic disk 12 in the deck subsection 10A onto the magnetic disk 12 in the deck subsection 10B, the synchronizing signal terminal 110 receives the VSYNC signal from the synchronizing signal separator 106A. When recording video signals supplied from an external source on the magnetic disk 12 in the deck subsection 10B, the synchronizing signal separator 106B of FIG. 1B receives the composite luminance signal Y+S supplied from the external source to a terminal 230 and separates the synchronizing signal S therefrom.

The servo circuit 20B is connected to the synchronizing signal separator 106A or 106B according to the connection state of the switch 220 to receive the synchronizing signal S therefrom so as to control the servo circuit 20B in synchronism with the signal S, thereby rotating the magnetic disk 12 in the recording deck subsection 10B in synchronism therewith. Incidentally, the system may be configured such that a phase synchronizing signal, PG, attained by sensing the timing mark disposed on a portion of a core of the magnetic disk 12 is used to establish a servo lock to the motor 14B.

The magnetic head 24B is connected via a switch 222 to a preamplifier 34B and a recording amplifier 162. The preamplifier 34B is connected to a terminal 226 of a switch 224, which has another terminal connected to an RF signal terminal 35. The switch 224 has a needle 228 connected to inputs of three filters, a high-pass filter 36B, a low-pass filter 38B, and a band-pass filter 40B.

The high-pass filter 36B has an output 42B connected via a delay circuit 240 to a limiter 242, whereas the low-pass filter 38B has an output 48B connected to a limiter 244. The limiters 242 and 244 have outputs respectively connected to level adjusters 250 and 252.

The delay circuit 240 is used to compensate for a difference between a signal delay time of circuitry including a high-pass filter 246 and frequency (f) characteristic correcting circuit 248 for the composite luminance signal Y+S, described later, and a signal delay time of circuitry comprising a high-pass filter 272 and an f characteristic correcting circuit 278 for the color difference signal C. Ordinarily, the signal delay of the latter is greater than that of the former, and the delay time of the delay circuit 240 is so set as to subject the composite luminance signal Y+S from the high-pass filter 36B to a delay of time substantially equal to the difference between the delay time of the circuitry for the Y+S signal and that of the circuitry for the color difference signal C, for example, to a value from about 300 nanoseconds (ns) to about 500 ns. This enables a time coincidence to be established between the signals Y+S and C.

In the higher frequency range, the playback frequency characteristic of the magnetic head generally tends to be attended with a greater reduction of a level of the reproduced signal. According to the specifications of a video floppy disk; however, the current level when recording video signals is required to be kept fixed with a frequency not below 2.5 MHz. Consequently, to keep the levels of the composite luminance signal Y+S and the color difference signal C respectively supplied from the high-pass filter 36B and the low-pass filter 38B regardless of the frequency, the levels are limited by the limiters 242 and 244, respectively, thereby enabling the signal levels to be adjusted by the level adjusters 250 and 252, respectively. The limiting operation would cause only the color difference signal to be extracted with the DPSK signal removed.

As can be understood from the description above, according to the embodiment, the signals from which the DPSK signals are separated are subjected to the level limitation by use of the limiters 242 and 244, respectively. As a consequence, since the low-frequency DPSK signal superimposed on the FM carrier cannot be lost through the limiting operation, the DPSK signal is appropriately demodulated by a demodulator 204B, and hence the control section 22B can receive the DPSK signal in the form of complete data.

The level adjusters 250 and 252 have outputs 254 and 256, respectively which are connected to respective terminals of switches 256 and 260. On the other hand, the composite luminance signal Y+S supplied from an external device to the terminal 230 is delivered to a frequency modulator 156. The frequency modulator 156 is used to frequency modulate the carrier of the high frequency band with the composite luminance signal Y+S. The color difference signal C delivered from an external device to a terminal 262 is fed to a frequency modulator 152. The frequency modulator 152 is used to frequency modulate the carrier of the low frequency band with the color difference signal C.

The frequency modulators 156 and 152 respectively have outputs 264 and 266 connected to other terminals of the switch 258 and 260, respectively. Needle terminals 268 and 270 of the switches 258 and 260 are connected to inputs of the high-pass filter 246 and low-pass filter 272, respectively. The high-pass filter 246 and the low-pass filter 272 have the frequency characteristics same as those of the high-pass filter 36A and the low-pass filter 38A, respectively.

The high-pass filter 246 and the low-pass filter 272 have outputs 274 and 276 connected to the f characteristic correctors 248 and 278, respectively. The f characteristic correctors 248 and 278 are compensating circuits for keeping substantially constant the levels of the composite luminance signal Y+S and the color difference signal C, respectively, regardless of the frequency. Output 280 and 282 therefrom are connected to level adjusters 284 and 286, respectively.

The DPSK data supplied from the control unit 22B of the recording function section to a data line 232 is fed to a DPSK modulator 288. The DPSK data, which contains information to be recorded on the magnetic disk 12 in the deck subsection 10B, is supplied, for example, from the console of the control unit 22B. The DPSK demodulator 288 demodulates the DPSK data to develop the resultant data to an output 290 connected to a band-pass filter 292. The band-pass filter 292 has a frequency pass band substantially identical to that of the band-pass filter 40A, and its output 294 is connected to a level adjuster 296.

The level adjusters 284, 286, and 296 have outputs 298, 300, and 302, respectively which are connected to a mixer 304. The mixer 304 mixes the video signals frequency modulated in the respective bands and received by the two inputs 298 and 300, and superimpose a data signal subjected to a differential PSK modulation and supplied to the input 302 onto the mixed video signals.

The mixer 304 has an output 306 supplied to the recording amplifier 162. An output from the recording amplifier 162 is connected via the switch 222 to the recording head 24B.

Like the control unit 22A, the control unit 22B supervises the overall operations of the recording section of this system in response to operations conducted at the operators' console, and is advantageously configured, for example, by use of a microprocessor system. A DPSK data input section 234 is connected to the control unit 22B to enable input DPSK data to be recorded on the magnetic disk 12 in the recording deck subsection 10B.

Although the control unit 22B is connected to the respective components of this system, the connections are symbolically indicated by the connecting line 78B. For example, the switches 220, 222, 224, 258, and 260 each are opened and closed under the control of the control unit 22B to read out video signals from the magnetic disk 12, thereby effecting a display on the monitor unit 210B and recording the signals on the magnetic disk 12. The circuits such as the recording amplifier 162 related to the recording operation are controlled at appropriate timing to supply one field of video signals to the magnetic head 24B, thus recording one field of video signals in a track.

A description will be now given of a case where the playback deck 10A and the recording deck 10B are loaded with a recorded disk 12 and a virgin magnetic disk 12, respectively, to effect a dubbing operation from the former to the latter. On receiving a dubbing instruction from the console unit, the control unit 22B changes over the switches 220, 222, 224, 258, and 260 to the reversed state opposite to that shown in the figure. The control unit 22B also controls the head transport mechanism to move the head 24B to a position over a free track on the magnetic disk 12 in the recording deck 10B.

The motor 14A rotates at a fixed rotary speed under the control of the servo circuit 20A, whereas the motor 14B rotates in synchronism with the motor 14A under the control of the servo circuit 20B. Namely, a synchronizing signal S is separated by a synchronizing signal separating circuit 106B from a signal sensed by the magnetic head to be then delivered from the FM demodulator 44A. The synchronizing signal S is supplied to the servo circuit 20B to effect a servo lock on the rotation of the motor 14B.

When the start of the dubbing operation is instructed through an operation from the console, the control unit 22A causes the head 24A in the recording head subsection 10A to move to a position over a first track on the recording surface. For example, a video signal with the RF frequency read out from the first track by the head 24A is passed to the filters 36A and 38A so as to be separated into a composite luminance signal Y+S including the synchronizing signal S and a color signal C, which are then delivered to the demodulators 44A and 50A to be respectively demodulated into signals associated with the respective basebands. The synchronizing signal S separated by the synchronizing signal separator 106A is delivered to the output 110 to be supplied to the servo circuit 20A. The luminance signal Y+S including the synchronizing signal S and the color difference signal C are supplied respectively via the FM demodulators 44A and 50A to the signal processor 202A.

Similarly, the DPSK signal superimposed in the video signal sensed by the head 24A is separated by the filter 40A from the composite luminance signal Y+S and the color difference signal C, and is then demodulated by the demodulator 204A into a signal in a baseband. The resultant signal is fed in the form of DPSK data to the control unit 22A.

The composite luminance signal Y+S and the line-sequential color-difference signal C respectively delivered from the demodulators 44A and 50A are combined in the signal processor 202A, and the obtained signal is fed as a composite color video signal from the video signal terminal 208A so as to be visualized on the video monitor 210A. In this operation, character data such as a frame number contained in the DPSK data supplied from the demodulator 204A to the control section 22A is superimposed on the video signal in the signal processor 202A so as to be multiplexed in the monitor display screen.

On the other hand, the RF signal produced from the preamplifier 34A is supplied via the terminal 35 to the high-pass filter 36B, the low-pass filter 38B, and the band-pass filter 40B. The RF signal is converted into a composite color video signal by the demodulators 44B, 50B, and 204B, the signal processor 202B, and the control unit 22B through an operation similar to that of the playback section. The resultant signal is delivered to an output terminal 208B. When there exists DPSK data to be recorded on the magnetic disk 12 in the recording deck subsection 10B, the DPSK data may be supplied from a DPSK data input 234. The input data is transferred from the control unit 22B to the signal processor 202B to be superimposed on the monitor video signal therein. The operator consequently may check the picture of the first track on the monitor 210B in this example.

The composite luminance signal Y+S passed through the high-pass filter 36B is supplied also to the delay circuit 240 to be subjected to a predetermined time delay, and then the delayed signal is fed to the limiter 242. The level of the signal is limited by the limiter 242 to a predetermined level set by the level adjuster 250. The resultant signal is supplied via the switch 258 to the high-pass filter 246. Similarly, the color difference signal C is fed also to the limiter 244. The level of the signal is limited by the limiter 244 to a predetermined level set by the level adjuster 250. The obtained signal is fed via the switch 258 to the low-pass filter 272.

The composite luminance signal Y+S for which the band is restricted by the high-pass filter 246 is subjected to a frequency characteristic correction in the f characteristic corrector 248 to be delivered via the level adjuster 284 to the mixer 304. Similarly, the color difference signal C for which the band is restricted by the low-pass filter 272 is subjected to a frequency characteristic correction by the f characteristic corrector 278 to be supplied via the level adjuster 286 to the mixer 304. On the other hand, the DPSK data fed from the DPSK data input 234 to the control unit 22B is supplied to the DPSK modulator 288 so as to be subjected to a DPSK demodulation. The signal is then subjected to a band restriction by the band-pass filter 292 and to a frequency characteristic correction by the f characteristic corrector 248, and is then fed via the level adjuster 296 to the mixer 304.

The mixer 304 combines the composite luminance signal Y+S, the line-sequential color-difference signal C, and the DPSK data respectively delivered from the three inputs 298, 300, and 302, and the composite signal is fed to the input 306 of the recording amplifier 162.

Under the control of the control unit 22B, the signal is supplied to the magnetic head 24B from the recording amplifier 162 for a vertical scanning (1V) period at an appropriate timing in synchronism with the rotation of the magnetic disk 12 in the recording deck 10B, so that one field of video signals are recorded in a track of the magnetic disk 12 in the recording deck 10B.

When the dubbing operation of a track is completed, the control units 22A and 22B control the associated deck sections 10A and 10B to cause the respective head moving mechanisms 28A and 28B to advance the associated heads 24A and 24B by one track distance of respective disks 12; thereafter, the operation described above will be repeated. In this fashion, through sequentially effecting the operation for the tracks of the magnetic disk 12 in the playback deck 10A, the video signals thereof will sequentially be recorded on the virgin disk 12 in the recording deck 10B, thereby accomplishing the dubbing operation.

When the video signal recording operation is finished in a track of the magnetic disk 12 in the deck 10B, the control unit 22B sets the switches 222 and 224 to the state shown in the figure to enable the video signals to be displayed on the monitor unit 210B.

For the picture monitor, pictures recorded on the magnetic disk 12 installed in the playback deck section 10A can be displayed on the monitor unit 210A. In addition, the monitor unit 210B can display a picture to be recorded onto the magnetic disk 12 loaded in the recording deck 10B, and a picture reproduced from the video signals beforehand recorded thereon. The operation to monitor pictures to be recorded on the magnetic disk 12 is achieved not only for video signal from the magnetic disk 12 installed in the playback function section but also for video signals received by the external terminals 230 and 262.

In a case where video signals supplied from an external device to the terminal 230 and 262 are to be recorded on the magnetic disk 12 in the recording deck 10B, the control unit 22B sets the switches 220, 222, 224, 258, and 260 to the connecting states shown in the figure. As a result, the synchronizing signal S separated by the synchronizing signal separator 10B from the composite luminance signal Y+S received by the terminal 230 is supplied to the servo circuit 20B, which rotates the motor 14B in synchronism with the synchronizing signal S.

The video signals to be recorded are delivered via the input terminals 230 and 262 to the FM demodulators 156 and 152, respectively. In this case, similarly to the case described above, these signals are supplied via the filters 246 and 272, the f characteristic correctors 248 and 278, the mixer 304, and the recording amplifier 162 to the magnetic head 24B. When necessary, the DPSK data from the control unit 22B is superimposed on the signals.

In this embodiment as described above, the video signals to be copied from the playback section of FIG. 1A to the recording section of FIG. 1C are transferred not in the form of baseband signals but in the form of radio frequency (RF) signals. Consequently, even when a special circuit such as an emphasis compensation circuit is not provided, the deterioration of the signals to be recorded will be minimized, and hence the picture quality of a recorded picture will be prevented from being lowered. In addition, this means that frames to be recorded on a magnetic disk may be edited without lowering the picture quality.

Moreover, the interface in RF signal enables a configuration in which a plurality of recording sections of FIG. 1C are connected to a sole playback section of FIG. 1A to be constructed, thereby achieving a dubbing operation from a recorded or source magnetic disk to a plurality of virgin disks.

Figure 2A:
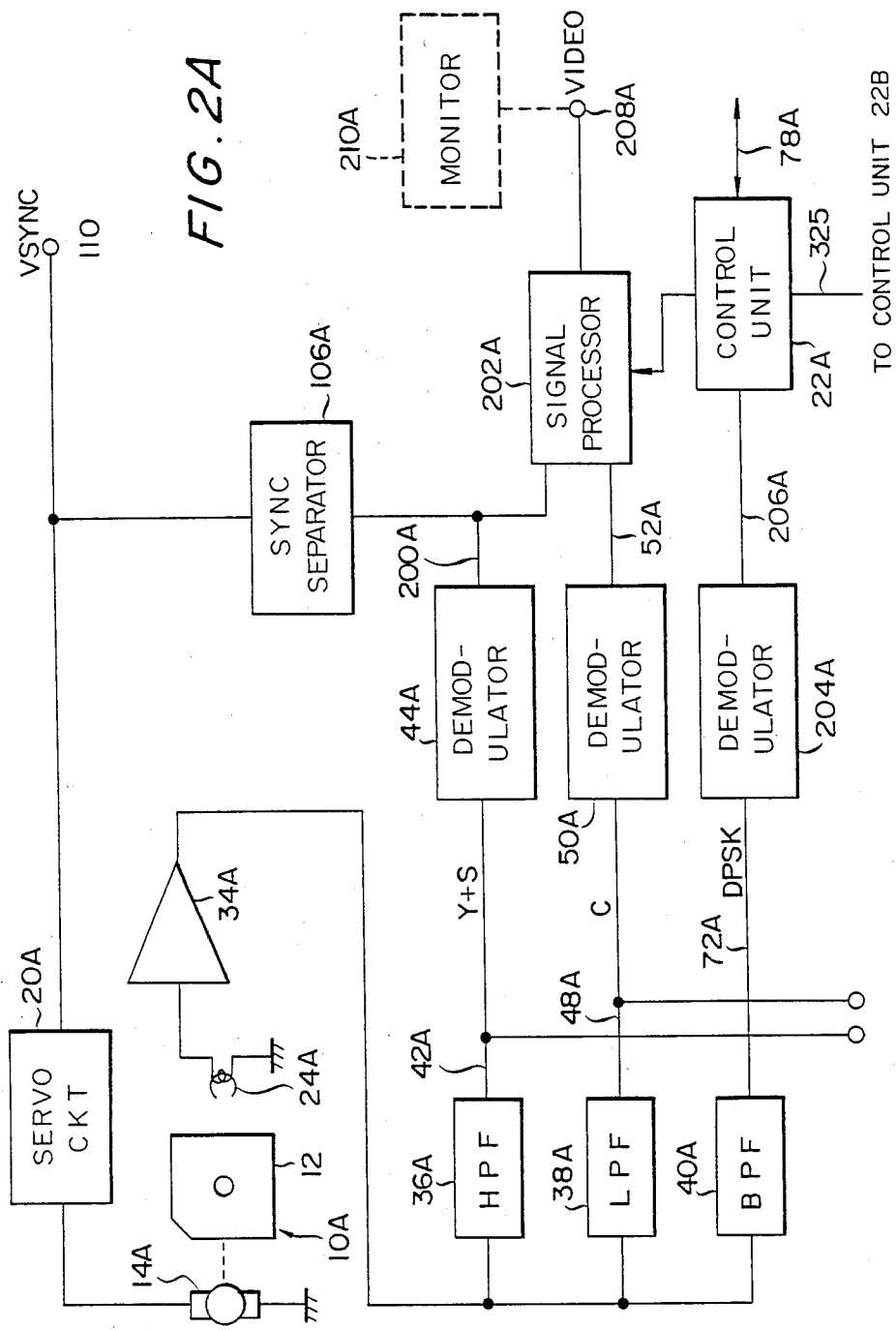

FIGS. 2A and 2B show an alternative embodiment of the present invention, in which components like those of FIGS. 1A and 1B are assigned with the same reference numerals with the circuit configuration shown in FIG. 1C also adopted. Consequently, the duplicated portions will not be described.

In the embodiment of FIGS. 1A–1C, the interface between the playback section and the recording section is implemented by use of modulated video signals including composite luminance signals and color difference signals; whereas, in the embodiment of FIGS. 2A and 2B, the interface is different from that of FIGS. 1A–1C in that the component signals of video signals, namely, the composite luminance signal Y+S, the color difference signal C, and the DPSK data are separately used for the interface. Naturally, also in this case, the video signals are not in the form of baseband signals but in the form of modulated signals.

To this end, in the embodiment of FIGS. 2A and 2B, the preamplifier 34A of the recording section has an output connected only to the high-pass filter 36A, the low-pass filter 38A, and the band-pass filter 40A. However, the high-pass filter 36A and the low-pass filter 48A respectively have outputs 42A and 48A connected via switches 320 and 322 to the inputs 42B and 48B of the demodulators 44B and 50B, respectively, as shown in this figure. Consequently, only the output 266 from the preamplifier 34B is connected to the inputs of the high-pass filter 36B and the low-pass filter 38B of the recording section.

The switches 320 and 322 are change-over circuits controlled by the control unit 22B, and are set to the connecting states shown in the figure when sensing the video signals recorded on the magnetic disk 12 in the deck 10B. When recording video signals on the magnetic disk 12 in the deck 10A, the switches 320 and 322 are switched to the connecting states opposite to those of the figure. The control unit 22A of the playback section and the control unit 22B of the recording section are interconnected with a bus 325 so as to communicate therebetween data such as the DPSK data.

As can be understood from the configuration above, in this embodiment, a video signal read out from the magnetic disk 12 in the playback deck 10A is transferred in the form of a composite luminance signal Y+S and a color difference signal C to the recording section so as to be recorded on the magnetic disk 12 in the recording deck 10B. Furthermore, the DPSK signal is received in the form of a data signal by the control unit 22A to be transferred on the bus 325 to the control unit 22B.

The present invention is not necessarily restricted by the embodiments, for example, the magnetic recording medium is not restricted by such a magnetic disk described in conjunction with the embodiments. Namely, the present invention is advantageously applicable to other recording media such as a magnetic tape and a magnetic drum.

According to the present invention as described above, the video signal to be subjected to a dubbing operation is transferred from a playback section to a recording section in a signal form such as a radio frequency signal attended with a minimized signal deterioration. This enables the picture monitor operation to be achieved directly with a picture from the video signal source in the playback section, and to be achieved with a picture to be recorded in the recording section and a picture reproduced from video signals beforehand recorded. The monitor operation of pictures to be recorded is effected not only with video signals from a magnetic recording medium loaded in the playback section but also with those supplied from an external source. As a result, a highly useful apparatus for copying video signals from a recording medium to a recording medium is provided.

As described above, according to the present invention, video signals to be copied are transferred from the playback section to the recording section in a signal form such as a radio frequency signal which is less attended with a signal deterioration. Consequently, even if a special circuit such as an emphasis compensation circuit is not used, the picture quality of a recorded picture is prevented from being lowered. This enables a frame to be recorded on a magnetic recording medium to be edited without lowering the picture quality. Moreover, it is also effectively achieved to effect a dubbing operation from a magnetic recording medium beforehand recorded to a plurality of virgin magnetic recording media.

While the present invention has been described with reference to the particular illustrative embodiments, it is not restricted by those embodiments but only by the appended claims. It is to be appreciated that those skilled in the art can change or modify the embodiments without departing from the scope and spirit of the present invention.

What I claim is:

1. An apparatus for reading out modulated video signals from a first magnetic recording medium on which the video signals modulated with a luminance signal and a color signal are recorded, and for recording the read out video signals on a second magnetic recording medium to thereby copy the video signals from the first magnetic recording medium to the second magnetic recording medium, comprising:

playback means for driving the first magnetic recording medium and for reading out the modulated video signals from the first magnetic recording medium;
   driving means for driving the second magnetic recording medium in synchronism with driving operation of the first magnetic recording medium;
   signal separating means for separating the luminance and color signals from the modulated video signals thus read out;
   first limiter means for limiting a level of the separated luminance signal;
   second limiter means for limiting a level of the separated color signal;
   first frequency characteristic correcting means for correcting a frequency characteristic of the luminance signal which is limited in level;
   second frequency characteristic correcting means for correcting a frequency characteristic of the color signal which is limited in level; and
   recording means for combining the luminance signal and the color signal respectively produced from said first and second frequency characteristic correcting means to record the combined signal in the form of a modulated video signal on the second magnetic recording medium.

2. An apparatus according to claim 1 wherein,
   said recording means includes second playback means for reading the modulated video signals recorded on the second magnetic recording medium;
   said second display means visually displaying a picture represented by the modulated video signals read out by said second playback means.

3. An apparatus according to claim 1 wherein,
   said modulated video signals are FM signals including a data signal DPSK modulated,
   said signal separating means including means for separating the data signal from the modulated video signals read out,
   said recording means comprising modulating means for DPSK modulating the data signal to superimpose, when combining the luminance signal and the color signal respectively produced from said first and second frequency characteristic correcting means, the data signal DPSK modulated onto the luminance and color signals.

4. An apparatus according to claim 1 further including,
   delay means for delaying the separated luminance signal by a predetermined period of time,
   said predetermined period of time being set to a value sufficient for compensating for a difference between a time delay introduced in circuitry including said first frequency characteristic correcting means and a time delay introduced in circuitry including said second frequency characteristic correcting means.

5. An apparatus according to claim 1 wherein,
   said playback means configures a playback section,
   all of said means other than said playback means configuring a recording section,
   the modulated video signals being transferred from said playback section to said recording section.

6. An apparatus according to claim 1 wherein,
   said playback means and said signal separating means configure a playback section,
   all of said means other than said playback means and said signal separating means configuring a recording section,
   the separated luminance signal and the separated color signal signals being transferred from said playback section to said recording section.

7. An apparatus according to claim 1 wherein said first and second magnetic recording media include a magnetic disk.

8. An apparatus for copying video signals from a first magnetic recording medium to a second magnetic recording medium comprising;
   a playback section for reading out modulated video signals from the first magnetic recording medium on which the video signals modulated with a luminance signal and a color signal are recorded; and
   a recording section for recording on the second magnetic recording medium the modulated video signals read out by said playback section;
   said playback section including:
   first playback means for driving the first magnetic recording medium and for reading out the modulated video signals from the first magnetic recording medium;
   synchronizing signal separating means for separating a synchronizing signal from the modulated video signals read out; and
   first display means for visually displaying a picture represented by the modulated video signals;
   said recording section including:
   signal separating means for receiving the modulated video signals to separate the luminance signal and the color signal from the modulated video signals;
   first limiter means for limiting a level of the separated luminance signal;
   second limiter means for limiting a level of the separated color signal;
   first frequency characteristic correcting means for correcting a frequency characteristic of the luminance signal limited in level;
   second frequency characteristic correcting means for correcting a frequency characteristic of the color signal limited in level;
   driving means for receiving the separated synchronizing signal to drive the second magnetic recording medium in response to the synchronizing signal;
   combining means for combining the luminance signal and the color signal respectively produced from said first and second frequency characteristic correcting means;
   recording means for recording signals supplied from said combining means in the form of modulated video signals on the second magnetic recording medium; and
   second display means for visually displaying a picture represented by the modulated video signals received from said first playback means.

9. An apparatus according to claim 8 wherein,
   said recording means includes second playback means for reading out the modulated video signals recorded on the second magnetic recording medium;

said second display means visually displaying a picture represented by the modulated video signals read out by said second playback means.

10. An apparatus according to claim 8 wherein, said modulated video signals are FM signals including a data signal DPSK modulated, said separating means including means for separating the data signal from the modulated video signals read out, said recording means comprising modulating means for DPSK modulating the data signal including the separated data signal;

said combining means, when combining the luminance signal and the color signal, superimposing the data signal DPSK modulated on the luminance signal and the color signal.

11. An apparatus according to claim 8 further including delay means for delaying the separated luminance signal by a predetermined period of time, said predetermined period of time being set to a value sufficient for compensating for a difference between a time delay introduced in circuitry including said first frequency characteristic correcting means and a time delay introduced in circuitry including said second frequency characteristic correcting means.

12. An apparatus according to claim 8 wherein said first and second magnetic recording media include a magnetic disk.

13. An apparatus for copying video signals from a first magnetic recording medium to a second magnetic recording medium comprising;

a playback section for reading out modulated video signals from the first magnetic recording medium on which the video signals modulated with a luminance signal and a color signal are recorded; and a recording section for recording on the second magnetic recording medium the modulated video signals read out by said playback section;

said playback section including:

first playback means for driving the first magnetic recording medium and for reading out the modulated video signals from the first magnetic recording medium;

synchronizing signal separating means for separating a synchronizing signal from the modulated video signals read out;

signal separating means for receiving the modulated video signals to separate the luminance signal and the color signal from the modulated video signals; and first display means for visually displaying a picture represented by the modulated video signals read out;

said recording section including:

first limiter means for receiving the separated luminance signal to limit a level of the separated luminance signal;

second limiter means for receiving the separated color signal to limit a level of the separated color signal;

first frequency characteristic correcting means for correcting a frequency characteristic of the luminance signal limited in level;

second frequency characteristic correcting means for correcting a frequency characteristic of the color signal limited in level;

driving means for receiving the separated synchronizing signal to drive the second magnetic recording medium in response to the synchronizing signal;

combining means for combining the luminance signal and the color signal respectively produced from said first and second frequency characteristic correcting means;

recording means for recording signals supplied from said combining means in the form of modulated video signals on the second magnetic recording medium; and second display means for visually displaying a picture represented by the modulated video signals received from said first playback means.

14. An apparatus according to claim 13 wherein, said recording means includes second playback means for reading out the modulated video signals recorded on the second magnetic recording medium;

said second display means visually displaying a picture represented by the modulated video signals read out by said second playback means.

15. An apparatus according to claim 13 wherein, said modulated video signals are FM signals including a data signal DPSK modulated, said separating means including means for separating the data signal from the modulated video signals read out, said recording means comprising modulating means for DPSK modulating the data signal including the separated data signal;

said combining means, when combining the luminance signal and the color signal, superimposing the data signal DPSK modulated on the luminance signal and the color signal.

16. An apparatus according to claim 13 further including delay means for delaying the separated luminance signal by a predetermined period of time, said predetermined period of time being set to a value sufficient for compensating for a difference between a time delay introduced in circuitry including said first frequency characteristic correcting means and a time delay introduced in circuitry including said second frequency characteristic correcting means.

17. An apparatus according to claim 13 wherein said first and second magnetic recording media include a magnetic disk.

* * * * *